(No Model.) 2 Sheets—Sheet 1.
A. GILLIAM.
HARNESS SADDLE TREE.
No. 330,313. Patented Nov. 10, 1885.
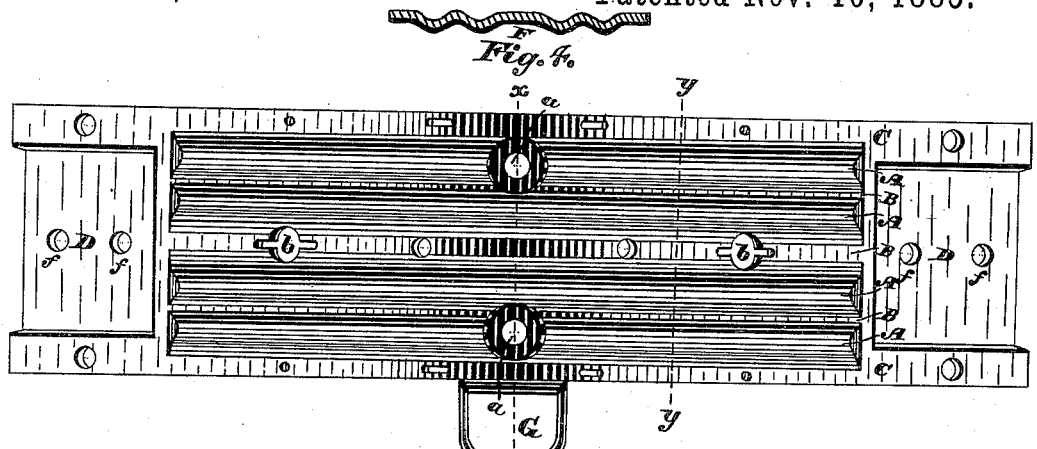
Fig. 4.
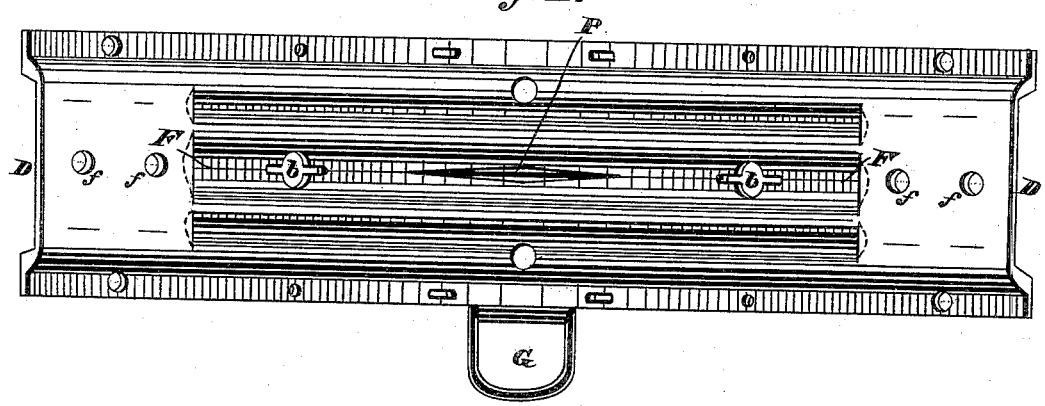
Fig. 1.
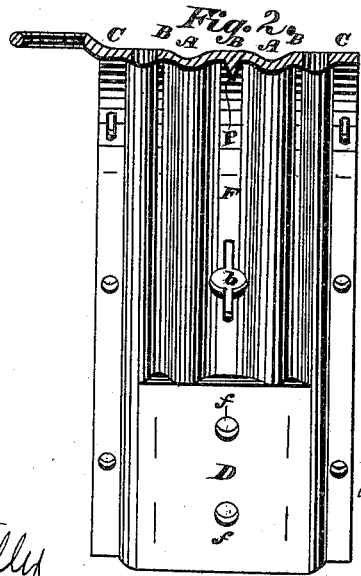
Fig. 2.
Fig. 3.
WITNESSES:
Harry Frease
Chas. R. Miller
INVENTOR
Algernon Gilliam
BY
W. K. Miller
ATTORNEY (No Model.)  2 Sheets—Sheet 2.
A. GILLIAM.
HARNESS SADDLE TREE.
No. 330,313. Patented Nov. 10, 1885.
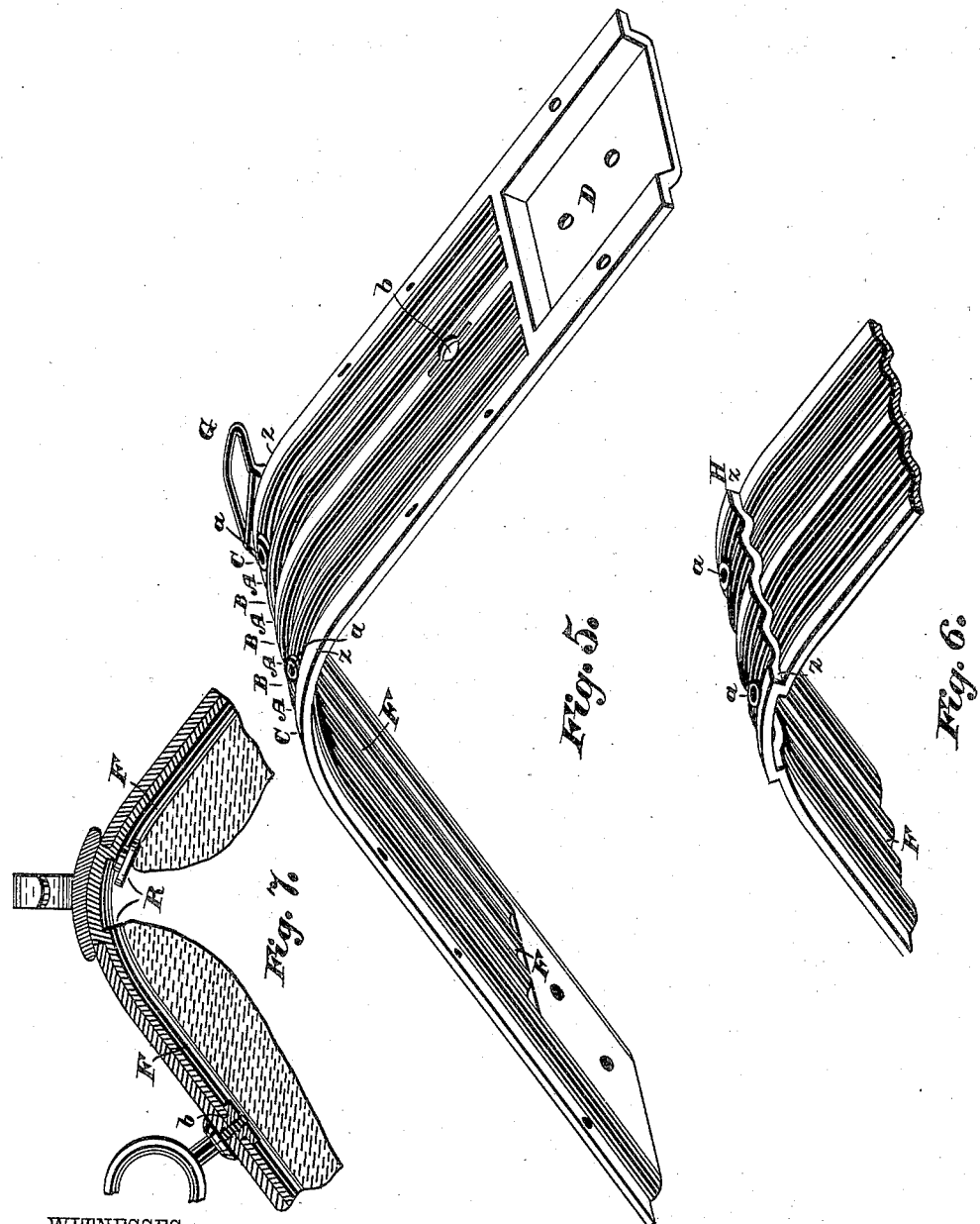
WITNESSES:
Harry Frease
Chas. R. Miller
INVENTOR
Algernon Gilliam
BY
W. K. Miller
ATTORNEY

UNITED STATES PATENT OFFICE.

ALGERNON GILLIAM, OF CANTON, OHIO.

HARNESS-SADDLE TREE.

SPECIFICATION forming part of Letters Patent No. 330,313, dated November 10, 1885.

Application filed August 28, 1885. Serial No. 175,576. (No model.)

*To all whom it may concern:*

Be it known that I, ALGERNON GILLIAM, a citizen of the United States, and a resident of Canton, county of Stark, State of Ohio, have invented a new and useful Improvement in Harness-Saddle Trees, of which the following is a full, clear, and exact description, reference being had to the accompanying drawings, making part of this specification.

My invention relates to improvements in harness-saddle trees, the object being to provide a metal tree adapted to form a cover for the pad and a support for the check-hook, jockey, and terrets and such other trimmings as are necessary or usual.

A further object is to so arrange and construct the tree that the terret-nut may be passed into the upper end of the groove provided for it and down to the perforation provided for the terret-shank.

A further object is to so dispose the metal in corrugated sections as to reduce the quantity and at the same time increase the strength and rigidity of the tree and also reduce the initial cost.

With these objects in view my invention consists of certain other features of construction and combination of parts hereinafter described, and set forth in the claims.

Figure 1 is a plan view of the top of my improved harness-saddle tree, showing longitudinal grooves A and elevations B parallel thereto, plane C, loop G, and sockets D D. Fig. 2 is a plan view of the tree inverted, showing a series of grooves and elevations parallel to each other, but inverted. F is a groove under elevation B for the reception of the terret-nut. P is a supporting-rib connecting the legs of the tree. Fig. 3 is a transverse vertical sectional view of the tree shown in Figs. 1 and 2. Fig. 4 is a view in cross-section on a line from Y to Y, showing the upper and lower line of corrugation. Fig. 5 is a view in perspective showing the corrugations formed by the grooves and elevations as lettered and referred to in Fig. 1. F is a groove under middle section, B, adapted to receive the terret-nut. Fig. 6 is a view in perspective showing an offset on a line from Z to Z. Fig. 7 is a longitudinal sectional view showing the terret-nut entering the groove F and in position.

The tree may be of cast malleable iron, or it may be stamped of plates of sheet-steel, and is in form a series of grooves, A, and elevations B, parallel to and alternate with each other, and extending from one end of the tree to the other, or from socket D to the other socket D, forming a corrugated web, as shown, in cross-section. (See Fig. 4.) The central curve or elevation B is larger than those on either side of it, and is so formed to provide a groove, F, on the under side of the tree large enough to receive and retain the usual terret-nut. The sockets D are provided to receive the skirt-supporting tongue. Metal re-enforcements about the perforations $a$ and $b$ may be provided to form a seat for the trimmings and to strengthen the tree at the point of perforation. There may be a shoulder, H, formed on a line from Z to Z, against which the end of the skirt may rest when not desirable to extend the ends to a point under the check-hook or to make the skirt in one continuous piece. The shoulder H forms an elevated seat for the check-hook, which may be either corrugated or plain, preferably corrugated, as a greater degree of rigidity may be obtained with a less amount of metal.

The loop G may be integral with the tree, or may be of a separate piece and attached to the tree in any of the usual well-approved ways. The corrugations should range so that the tree may rest upon the pad without an intervening piece of metal or other material, also that the skirt may rest directly upon the tree, dispensing with all unnecessary bulk and weight of material. Perforations $a$ are provided for the screws or other means by which the check-hook may be attached to the tree, and perforations $b$ to receive the terret-shank. The small perforations $f$ in the socket D are for rivets or other fastenings for the skirt, and those along the edge (designated $g$) are for attaching the skirt.

I will not describe any plan or method of padding, covering, or trimming the tree, as it is adapted for many of the well-known and approved methods, and may be varied to suit circumstances or the demands of trade; but I do desire to call attention to conveniences provided to facilitate the trimming or a change of trimming, having in manufacturing experienced the inconvenience of trimming or passing the terret-nuts up from the lower end of the tree. One of the principal objects of this invention is to provide a tree that can be trimmed from above—that is, after the pad, skirt, and jockey have been placed on the tree and the mounting about to be placed, I insert the terret-nut into the open end of groove F at R, (see Fig. 7,) and pass it down the groove until in line with perforation *b* provided for the terret, when the threaded shank may be passed through the jockey and tree and turned into the nut. If, for any reason, it may be desirable to remove the nut, turn out the terrets, invert the tree, and the nuts will drop to the center of the tree to a point where they may be easily removed.

Having thus fully described the nature and object of my invention, what I claim, and desire to secure by Letters Patent, is—

1. A harness-saddle tree having a central longitudinal groove adapted to receive the terret-nuts, and a series of parallel elevations and grooves on opposite sides of the central longitudinal groove.

2. A harness-saddle tree having skirt-sockets, as described, a central longitudinal groove for the terret-nuts, and a series of longitudinal grooves and elevations extending from one socket to the other.

3. A harness-saddle tree having skirt-sockets, as described, and a series of longitudinal grooves and elevations extending from one socket to the other, substantially as described, and for the purpose set forth.

4. A harness-saddle tree leg formed of a series of grooves alternate with parallel elevations, forming a corrugated web between the skirt-socket D and the check-hook seat.

5. A harness-saddle tree having the shoulders H, and check-hook seat between said shoulders, the said seat having a corrugated face, and openings *a a*.

6. A harness-saddle tree having the shoulders H, raised check-hook seat, skirt-sockets, and grooves for the terret-nuts extending from the shoulders to the skirt-sockets, substantially as set forth.

7. A harness-saddle tree having a central groove closed at its lower end by connection with a socket formed for the reception of the skirt, and open at its upper end for the reception of the terret-nut, and also provided with a series of longitudinal grooves and elevations on opposite sides of the central groove, substantially as described, and for the purpose set forth.

In testimony whereof I have hereunto set my hand this 27th day of August, A. D. 1884.

ALGERNON GILLIAM.

Witnesses:
CHAS. R. MILLER,
W. K. MILLER.